US009131513B2

(12) United States Patent
Cai et al.

(10) Patent No.: US 9,131,513 B2
(45) Date of Patent: Sep. 8, 2015

(54) COORDINATING ALLOCATION OF RESOURCES FOR USE BY SMALL CELLS

(71) Applicant: BLACKBERRY LIMITED, Waterloo (CA)

(72) Inventors: Zhijun Cai, Herndon, VA (US); Yi Song, Plano, TX (US); Chandra Sekhar Bontu, Nepean (CA); David Nigel Freeman, Basingstoke (GB)

(73) Assignee: BlackBerry Limited, Waterloo, Ontario (CA)

( * ) Notice: Subject to any disclaimer, the term of this patent is extended or adjusted under 35 U.S.C. 154(b) by 61 days.

(21) Appl. No.: 13/968,642

(22) Filed: Aug. 16, 2013

(65) Prior Publication Data
US 2015/0050940 A1 Feb. 19, 2015

(51) Int. Cl.
*H04W 28/18* (2009.01)
*H04W 72/08* (2009.01)
*H04W 72/04* (2009.01)
*H04W 88/08* (2009.01)
*H04W 88/12* (2009.01)

(52) U.S. Cl.
CPC ........ *H04W 72/082* (2013.01); *H04W 72/0433* (2013.01); *H04W 88/08* (2013.01); *H04W 88/12* (2013.01)

(58) Field of Classification Search
CPC ............ H04W 72/04; H04W 72/0406; H04W 72/0453; H04W 72/1252; H04W 88/06; H04W 24/10; H04W 28/0236
USPC ..................... 455/450, 452.1, 452.2, 509–515
See application file for complete search history.

(56) References Cited

U.S. PATENT DOCUMENTS

| | | |
|---|---|---|
| 2008/0069020 A1 | 3/2008 | Richardson |
| 2008/0267146 A1 | 10/2008 | Lewis |
| 2008/0268833 A1 | 10/2008 | Huang et al. |
| 2009/0040982 A1 | 2/2009 | Ho |
| 2009/0232019 A1 | 9/2009 | Gupta |
| 2009/0307556 A1 | 12/2009 | Cai et al. |
| 2009/0310487 A1 | 12/2009 | Eriksson |
| 2010/0098006 A1* | 4/2010 | Golitschek Edler Von Elbwart et al. ............................ 370/329 |
| 2010/0182950 A1 | 7/2010 | Sexton |
| 2010/0246483 A1 | 9/2010 | Erceg |
| 2010/0322227 A1 | 12/2010 | Luo |

(Continued)

FOREIGN PATENT DOCUMENTS

| | | |
|---|---|---|
| EP | 2622901 B1 | 6/2014 |
| EP | 2753035 A2 | 7/2014 |

(Continued)

OTHER PUBLICATIONS

European Patent Office, Extended Search Report for European Appl. No. 14180755.2 dated Jan. 29, 2015 (6 pages).

(Continued)

*Primary Examiner* — Kashif Siddiqui
*Assistant Examiner* — Obidon Bassinan
(74) *Attorney, Agent, or Firm* — Trop Pruner & Hu, P.C.

(57) ABSTRACT

A controller receives information relating to at least one of multiple small cells. Responsive to the received information, the controller coordinates allocation of resources for use by the small cells in communicating data with respective user equipments (UEs), where the coordinating of the allocation of resources reduces interference among the small cells.

25 Claims, 5 Drawing Sheets

(56) References Cited

U.S. PATENT DOCUMENTS

| | | | |
|---|---|---|---|
| 2011/0105144 A1 | 5/2011 | Siomina et al. | |
| 2011/0110311 A1* | 5/2011 | Krause et al. | 370/329 |
| 2011/0158171 A1 | 6/2011 | Centonza et al. | |
| 2011/0170506 A1 | 7/2011 | Zisimopoulous et al. | |
| 2011/0216712 A1 | 9/2011 | Yang et al. | |
| 2011/0310830 A1* | 12/2011 | Wu et al. | 370/329 |
| 2012/0002564 A1 | 1/2012 | Sexton | |
| 2012/0115469 A1* | 5/2012 | Chen et al. | 455/434 |
| 2012/0122440 A1* | 5/2012 | Krishnamurthy et al. | 455/418 |
| 2012/0214445 A1 | 8/2012 | Stojanovski | |
| 2013/0059593 A1 | 3/2013 | Hu | |
| 2013/0107798 A1 | 5/2013 | Gao | |
| 2013/0137469 A1 | 5/2013 | Schmidt et al. | |
| 2013/0143569 A1 | 6/2013 | Kapoor et al. | |
| 2013/0150106 A1* | 6/2013 | Bucknell et al. | 455/501 |
| 2014/0036664 A1 | 2/2014 | Han et al. | |
| 2014/0204771 A1 | 7/2014 | Gao | |
| 2014/0254476 A1 | 9/2014 | Blankenship | |
| 2014/0269632 A1 | 9/2014 | Blankenship | |
| 2014/0328182 A1 | 11/2014 | Gao | |
| 2015/0036566 A1 | 2/2015 | Blankenship | |
| 2015/0045038 A1 | 2/2015 | Gao | |

FOREIGN PATENT DOCUMENTS

| | | |
|---|---|---|
| WO | 2014176781 | 11/2014 |
| WO | 2015013858 | 2/2015 |

OTHER PUBLICATIONS

3GPP TS 33.401 V8.4.0, Technical Specification, 3rd Generation Partnership Project; Technical Specification Group Services and System Aspects; 3GPP System Architecture Evolution (SAE): Security architecture; (Release 8), Jun. 2009 (95 pages).

3GPP TR 33.821 V8.0.0, Technical Report, 3rd Generation Partnership Project; Technical Specification Group Services and System Aspects; Rationale and track of security decisions in Long Term Evolved (LTE) RAN / 3GPP System Architecture Evolution (SAE) (Release 8), Mar. 2009 (137 pages).

3GPP TS 36.300 V10.3.0, Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), Mar. 2011 (197 pages).

3GPP TS 36.331 V11.0.0, Technical Specification, 3rd Generation Partnership Project; Technical Specification Group Radio Access Network; Evolved Universal Terrestrial Radio Access (E-UTRA); Radio Resource Control (RRC); Protocol specification (Release 11), Jun. 2012 (302 pages).

3GPP TS 36.413 V11.1.0, Technical Specification, 3rd Generation Partnership Project; Technical Specification Group Radio Access Network; Evolved Universal Terrestrial Radio Access Network (E-UTRAN); S1 Application Protocol (S1AP) (Release 11), Sep. 2012 (262 pages).

3GPP TS 36.423 V11.2.0, Technical Specification, 3rd Generation Partnership Project; Technical Specification Group Radio Access Network; Evolved Universal Terrestrial Radio Access Network (E-UTRAN); X2 application protocol (X2AP) (Release 11), Sep. 2012 (136 pages).

3GPP TR 36.806 V9.0.0, Technical Report, 3rd Generation Partnership Project; Technical Specification Group Radio Access Network; Evolved Universal Terrestrial Radio Access (E-UTRA); Relay architectures for E-UTRA (LTE-Advanced) (Release 9), Mar. 2010 (34 pages).

3GPP TR 36.839 V11.1.0, Technical Report, 3rd Generation Partnership Project; Technical Specification Group Radio Access Network; Evolved Universal Terrestrial Radio Access (E-UTRA); Mobility enhancements in heterogeneous networks (Release 11), Dec. 2012 (53 pages).

3GPP TR 36.912 V11.0.0, Technical Report, 3rd Generation Partnership Project; Technical Specification Group Radio Access Network; Feasibility study for Further Advancements for E-UTRA (LTE-Advanced) (Release 11), Sep. 2012 (62 pages).

Han et al., Capacity Analysis of Generalized Distributed Wireless Communication System and Transmit Antenna Selection for Maximization of Average Capacity, IEEE 2004 (5 pages).

Shan-Yuan Hol, Data Fusion in a Relay Network, SIT 2008, Toronto, Canada, Jul. 6-11, 2008 (5 pages).

Vasken Genc et al., IEEE 802.16J Relay-Based Wireless Access Networks: An Overview, Oct. 2008 (8 pages).

Kerpez et al., IEEE Transactions on Vehicular Technology, vol. 45, No. 2, 265—A Radio Access System with Distributed Antennas, May 1996 (11 pages).

David Soldani et al., Radio Communications Series, Nokia Siemens Networks, Wireless Relays for Broadband Access, Mar. 2008 (9 pages).

[Draft] 3GPP TR 36.392 V0.1.0 Technical Report 3rd Generation Partnership Project; Technical Specification Group Radio Access Network; Scenarios and Requirements for Small Cell Enhancement for E-UTRA and E-UTRAN; (Release 12) (Oct. 2012) (12 pages).

3GPP TS 36.211 V11.3.0; Technical Specification; 3rd Generation Partnership Project; Technical Specification Group Radio Access Network; Evolved Universal Terrestrial Radio Access (E-UTRA); Physical Channels and Modulation (Release 11) (Jun. 2013) (108 pages).

3GPP TS 36.300 V11.6.0; Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11) (Jun. 2013) (209 pages).

3GPP TS 36.321 V11.3.0; Technical Specification; 3rd Generation Partnership Project; Technical Specification Group Radio Access Network; Evolved Universal Terrestrial Radio Access (E-UTRA); Medium Access Control (MAC) protocol specification (Release 11) (Jun. 2013) (57 pages).

3GPP TS 36.331 V11.4.0; Technical Specification; 3rd Generation Partnership Project; Technical Specification Group Radio Access Network; Evolved Universal Terrestrial Radio Access (E-UTRA) Radio Resource Control (RRC); Protocol specification (Release 11) (Jun. 2013) (346 pages).

3GPP TSG-RAN WG2 Meeting #75bis; R2-114950, Agenda Item 7.9; Source ZTE; "Discussion on the mobility performance enhancement for co-channel HetNet deployment": For Discussion and Decision; (Oct. 10-14, 2011) Zhuhai, China; (7 pages).

* cited by examiner

COORDINATING ALLOCATION OF RESOURCES FOR USE BY SMALL CELLS

BACKGROUND

As the demand for wireless data communication using wireless user equipments (UEs) has increased, wireless access service providers are increasingly facing challenges in meeting capacity demands in regions where the density of users is relatively high. To address capacity issues, heterogeneous networks can be deployed.

A heterogeneous network can include various different types of network nodes, including some combination of the following: macro wireless access network nodes that provide macro cells, pico wireless access network nodes that provide pico cells, femto wireless access network nodes that provide femto cells, and relay nodes. A pico cell refers to a cell that has a relatively small coverage area, such as within a building, a train station, airport, aircraft, or other small areas. A femto cell is a cell that is designed for use in a home or small business. A femto cell is associated with a closed subscriber group (CSG), which specifies that only users within a specific group are allowed to access the femto cell. A relay node is used for relaying data from one wireless entity to another wireless entity.

BRIEF DESCRIPTION OF THE DRAWINGS

Some embodiments are described with respect to the following figures.

DETAILED DESCRIPTION

Figure 1:
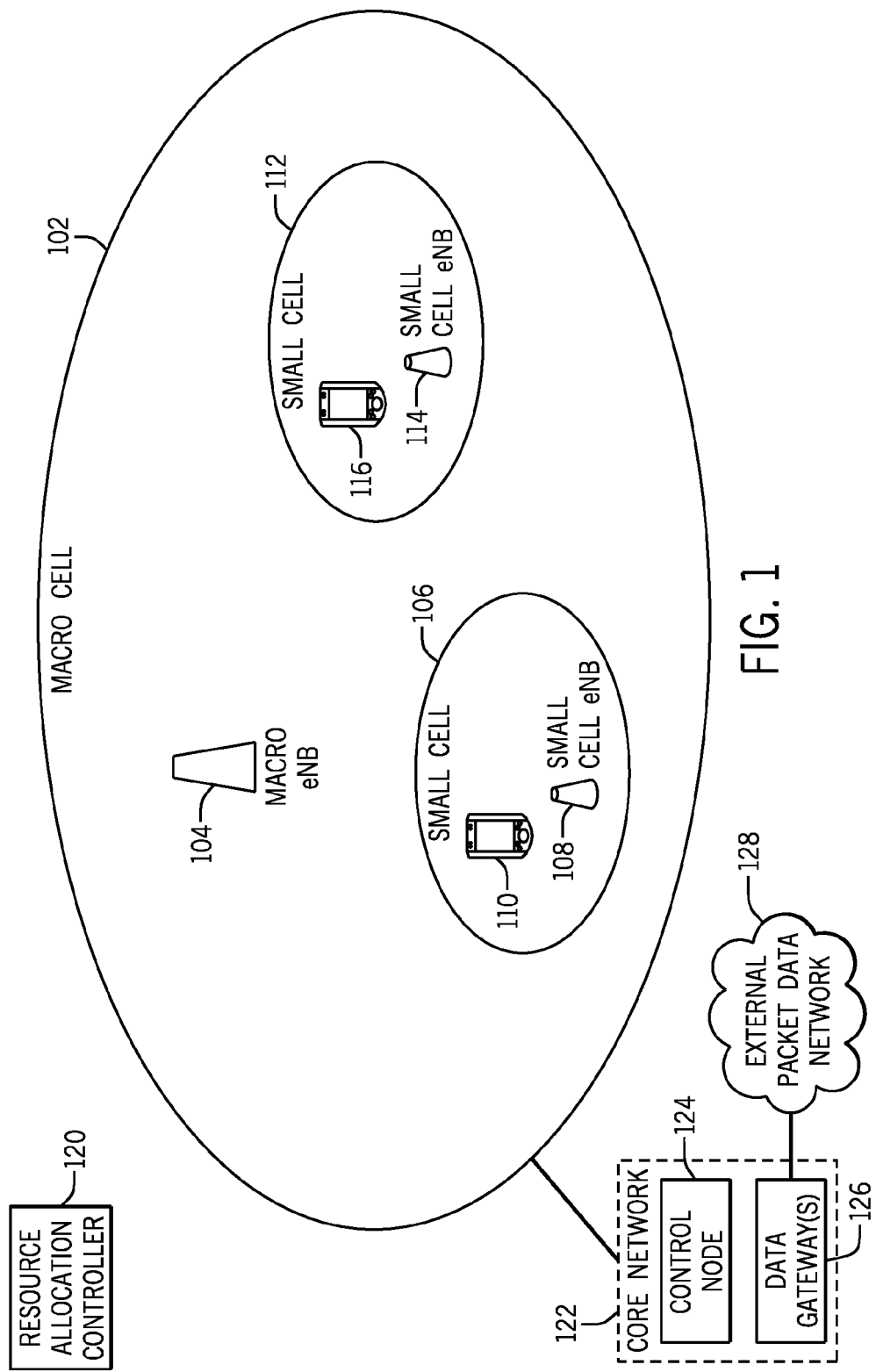
FIG. 1 is a schematic diagram of an example heterogeneous network according to some implementations.

An example heterogeneous network arrangement is shown in FIG. 1, which includes a macro cell 102 and various small cells 106, 112 within the coverage area of the macro cell 102. Although just two small cells 106 and 112 are depicted in FIG. 1, it is noted that there can be additional small cells within the coverage area of the macro cell 102. Also, there can be multiple macro cells. The macro cell 102 is provided by a macro wireless access network node 104, while the small cells 106, 112 are provided by respective small cell wireless access network nodes 108, 114.

The small cell wireless access network nodes 108, 114 can include one or more of the following: pico wireless access network nodes, femto wireless access network nodes, and relay nodes. A macro wireless access network node generally is considered a higher power network node, since it is able to transmit signals at a higher power level. Pico wireless access network nodes, femto wireless access network nodes, and relay nodes are generally considered lower power network nodes, since such network nodes transmit signals at a lower power level than the transmissions of the macro wireless access network node.

As depicted in FIG. 1, the macro cell 102 provided by the macro wireless access network node 104 can overlay the coverage areas of the lower power network nodes, and in some cases can share the same frequency or frequencies. In the ensuing discussion, lower power network nodes such as pico wireless access network nodes, femto wireless access network nodes, and relay nodes are referred to as small cell wireless access network nodes.

In a heterogeneous network having different types of network nodes, interference can occur between network nodes. For example, a transmission from a network node can interfere with reception of communication from a second network node. In a specific example, it is assumed that the small cell 106 is a femto cell, which can be associated with member user equipments (UEs). A member UE refers to a UE that is part of a closed subscriber group (CSG) that has permission to access the femto cell.

The femto wireless access network node 108 is able to transmit information, including control information, that can be received by a member UE within the femto cell 106. One example of such control information from the femto wireless access network node can be carried in a Physical Downlink Control Channel (PDCCH).

In an example, it is assumed that the UE 110 is a non-member UE (with respect to the femto cell 106). The non-member UE 110 is in the coverage area of the femto cell, but this non-member UE 110 does not have permission to connect to the femto wireless access network node 108. However, the non-member UE 110 is able to receive transmissions of the macro wireless access network node 104. When the non-member UE 110 is within the coverage area of the femto cell 106, reception of control information (e.g. PDCCH transmitted by the macro wireless access network node 104) at the non-member UE 110 can be interfered by downlink transmissions from the femto wireless access network node 108 to member UEs.

In another example, it is assumed that the small cell 112 is a pico cell, and that a UE 116 is served by the pico wireless access network node 114. The UE 116 is located at the edge of the serving pico cell 112. In this example, certain control signals transmitted by the pico wireless access network node 114 for receipt by the UE may be interfered with by downlink transmissions from the macro wireless access network node 104.

Additionally, in a heterogeneous network, there can be a relatively high density of small cells (e.g. pico cells, femto cells, coverage areas of relay nodes, or any combination of the foregoing). Due to the relative close proximity of the small cells, interference between the small cells may also arise, which can reduce system capacity and affect UE performance, such as the ability of a UE to detect a small cell, to perform channel estimation, to receive control information, and so forth.

In accordance with some implementations, a resource allocation controller 120 is provided for dynamically allocating resources for use by small cells in communicating data with respective UEs. The coordination of the allocation of resources reduces interference in communications of the UEs, including interference between small cells or between a small cell and a macro cell.

In the ensuing discussion, reference is made to mobile communications networks that operate according to the Long-Term Evolution (LTE) standards as provided by the Third Generation Partnership Project (3GPP). The LTE standards are also referred to as the Evolved Universal Terrestrial Radio Access (E-UTRA) standards.

Although reference is made to E-UTRA in the ensuing discussion, it is noted that techniques or mechanisms according to some implementations can be applied to other wireless access technologies.

In an E-UTRA network, a wireless access network node can be implemented as an enhanced Node B (eNB), which includes functionalities of a base station and base station controller. Thus, in an E-UTRA network, a macro wireless access network node is referred to as a macro eNB. In an E-UTRA network, small cell wireless access network nodes can be referred to as small cell eNBs.

The resource allocation controller 120 can be part of the macro eNB 104. Alternatively, the resource allocation controller 120 can be one of the small cell eNBs 110, 116, and more particularly, an anchor small cell eNB that is designated as the head of a cluster of small cells. As further examples, the resource allocation controller 120 can be a separate controller from the macro and small cell eNBs. For example, the resource allocation controller 120 can be in a network node of a core network 122.

The core network 122 includes a control node 124 and one or more data gateways 126. The data gateway(s) 126 can be coupled to an external packet data network (PDN) 128, such as the Internet, a local area network (LAN), a wide area network (WAN), and so forth. Although not explicitly shown, the macro eNB 104 and at least some small cell eNBs can be coupled to the core network 122.

In an E-UTRA network, the control node 124 in the core network 122 can be implemented as a mobility management entity (MME). An MME is a control node for performing various control tasks associated with an E-UTRA network. For example, the MME can perform idle mode UE tracking and paging, bearer activation and deactivation, selection of a serving gateway (discussed further below) when the UE initially attaches to the E-UTRA network, handover of the UE between macro eNBs, authentication of a user, generation and allocation of a temporary identity to a UE, and so forth. In other examples, the MME can perform other or alternative tasks.

In an E-UTRA network, the data gateway(s) 126 of the core network 122 can include a serving gateway (SGW) and a packet data network gateway (PDN-GW). The SGW routes and forwards traffic data packets of a UE served by the SGW. The SGW can also act as a mobility anchor for the user plane during handover procedures. The SGW provides connectivity between the UE and the PDN 128. The PDN-GW is the entry and egress point for data communicated between a UE in the E-UTRA network and a network element coupled to the PDN 128. Note that there can be multiple PDNs and corresponding PDN-GWs. Moreover, there can be multiple MMEs and SGWs.

Figure 2:
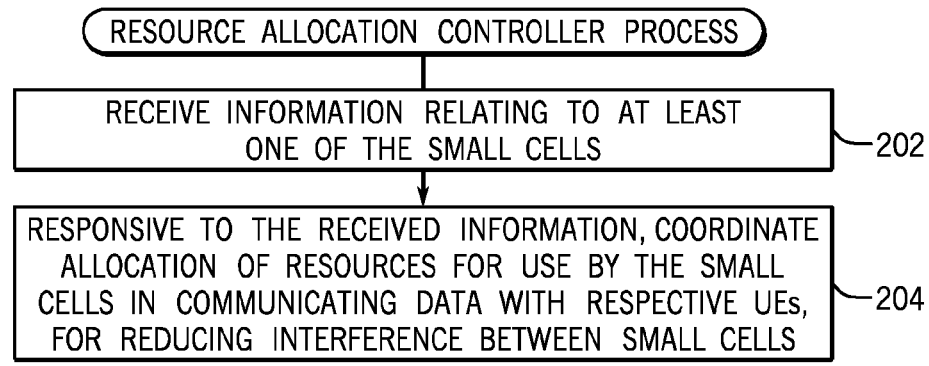
FIG. 2 is a flow diagram of an example resource allocation process according to some implementations.

FIG. 2 is a flow diagram of a process of interference mitigation, according to some implementations. The resource allocation controller 120 receives (at 202) information relating to at least one of the small cells, such as small cells 106 and 112. Responsive to the received information, the resource allocation controller 120 coordinates (at 204) allocation of resources for use by the small cells in communicating data with respective UEs, for reducing interference at the UE caused by the signals transmitted from the small cells.

As discussed further below, the allocated resources can include subframes. A subframe refers to a container for carrying data or control information, or both, where the subframe has a specified time duration. In an E-UTRA network, a number of subframes (e.g. 10 subframes) make up a radio frame. A subframe can be designated to carry uplink information or downlink information, including control information or traffic data, or both. In some implementations, the allocated resources can include physical resource blocks if the control information is carried in an Enhanced PDCCH (E-PDCCH). In some other implementations, the allocated resources can include frequencies or carriers, especially in a multi-carrier system or carrier aggregation system.

In other implementations, the allocated resources can be part of dynamic resources, including subframes, carriers, or both, that can be dynamically allocated to small cells.

Dynamic ABS Assignment

In accordance with some implementations, the coordination (at 204) of allocation of resources includes dynamic assignment of downlink Almost Blank Subframes (ABS) to small cells. An ABS subframe is a subframe with reduced transmit power (or no transmit power) on certain physical channels, due to reduced content in the ABS. In some implementations, an ABS subframe contains just a subset of control information, such as a primary synchronization signal and secondary synchronization signal (PSS/SSS), a Physical Broadcast Channel (PBCH), a cell-specific reference signal (CRS), and selected system information (such as that included in System Information Block Type 1).

Figure 3:
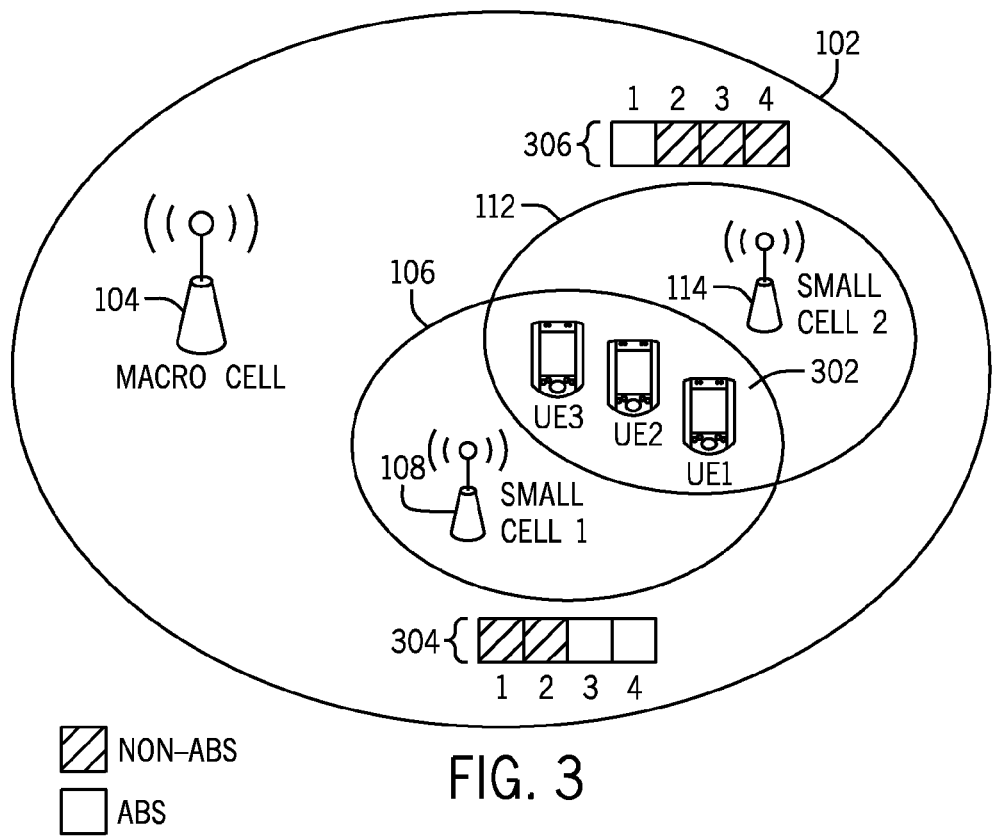
FIG. 3 is a schematic diagram illustrating allocation of subframe patterns to different small cells, according to some implementations.

FIG. 3 shows an example of assignment of ABS subframes to respective small cells 106 and 112. In the FIG. 3 example, it is assumed that the resource allocation controller 120 is part of the macro eNB 104. It is also assumed that there is some amount of overlap (overlapping region 302) between the small cells 106 and 112. A first subframe pattern 304 can be assigned to the first small cell 106, while a second subframe pattern 306 can be assigned to the second small cell 112. In the example of FIG. 3, each subframe pattern 304 or 306 includes four subframes. (Note that there can be a greater number of subframes in a subframe pattern). In each subframe pattern 304 or 306, a blank box represents an ABS subframe, while a box with a hash pattern represents a non-ABS Subframe (in other words, a subframe that carries content such as data or control information or both). Each of the subframe patterns 304 and 306 can also be referred to as an ABS configuration. An ABS configuration specifies which subframe(s) is (are) to be ABS subframes.

In the FIG. 3 example, subframe 1 in the subframe pattern 306 is an ABS subframe, while subframes 2, 3, and 4 are non-ABS subframes. In the subframe pattern 304, subframes 1 and 2 are non-ABS subframes, while subframes 3 and 4 are ABS subframes.

Because subframe 1 in the subframe pattern 306 for the second small cell 112 is an ABS subframe, the small cell eNB 108 in the first small cell 106 can schedule UEs (e.g. UE1) in the overlapping region 302 using subframe 1. Scheduling a UE using a given subframe refers to scheduling the UE to perform communications in the given subframe.

Because subframe 2 in the subframe pattern 306 for the second small cell 112 is a non-ABS subframe, the small cell eNB 108 in the first small cell 106 can use subframe 2 to schedule UEs in a non-overlapping region (as well as UEs in the overlapping region 302). A non-overlapping region of the first small cell 106 is the portion of the small cell 106 that is distinct from the overlapping region 302; in other words, the non-overlapping region of the first cell 106 does not overlap the second small cell 112. Subframe 2 can be used by small cell 106 or small cell 112 for UEs in the overlapping region, for example, when the UEs are capable of interference cancellation.

Because subframes 3 and 4 in the subframe pattern 304 for the first small cell 106 are ABS subframes, the small cell eNB 114 in the second small cell 112 can use subframes 3 and 4 to schedule UEs (e.g. UE2 and UE3) in the overlapping region 302 (as well as UEs in the non-overlapping region of the second small cell 112). Also, because subframe 2 in the subframe pattern 304 for the first small cell 106 is a non-ABS subframe, the small cell eNB 114 in the second small cell 112 can use subframe 2 to schedule UEs in a non-overlapping area of the small cell 112.

More generally, by assigning a given subframe as an ABS subframe in a first small cell, a second small cell can use the given subframe to schedule UEs in the second small cell to avoid or reduce interference between the small cells. In other words, a UE performing communications in the given subframe in the second small cell would experience reduced interference since the given subframe is an ABS subframe in the first small cell.

Figure 4:
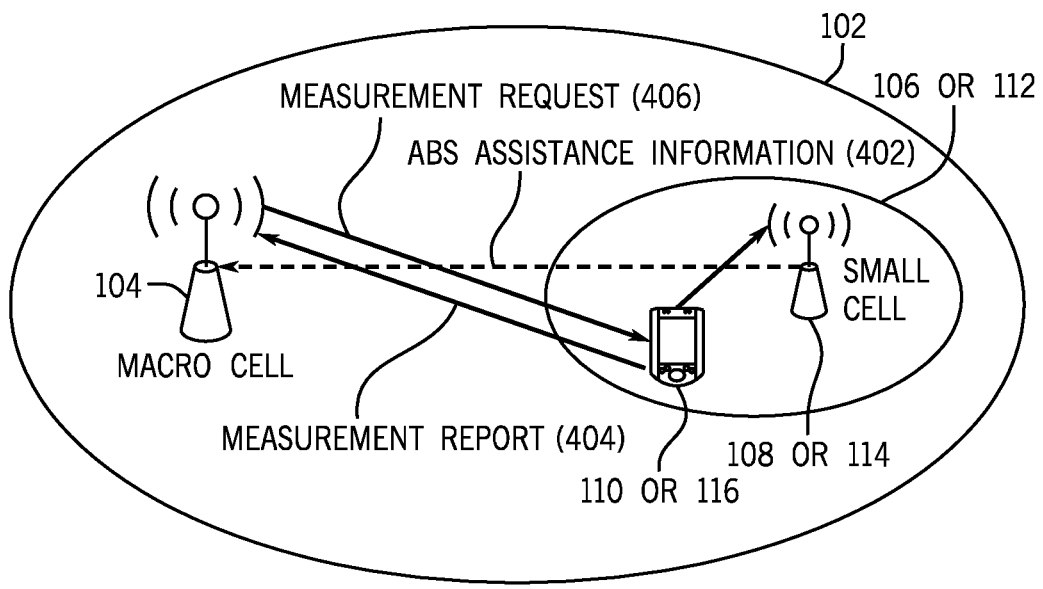
FIG. 4 is a schematic diagram illustrating communication of information to a resource allocation controller to use for allocation of resources to small cells, according to some implementations.

FIG. 4 also depicts an example in which the resource allocation controller 120 is part of the macro eNB 104. The macro eNB 104 can obtain information from a small cell eNB or UE (or both a small eNB and the UE), and can use the obtained information to determine the dynamic allocation of ABS subframes to small cells. The small cell eNB 108 or 114 can send ABS assistance information 402 to the macro eNB 104, such as over an X2 interface between the macro eNB 104 and the small cell eNB. The ABS assistance information 402 reported by the small cell eNB to the macro eNB 104 can include one or some combination of the following: number of users in the small cell 106 or 112, the aggregate downlink data rate (or total downlink data rate of downlink communications from the small cell eNB to UEs served by the small cell eNB), an average queuing delay (average delay of data in a queue containing downlink data to be transmitted to UEs served by the small cell eNB), a number of UEs in a range expansion area or in an overlapping region between small cells, the aggregate downlink data rate to the UEs in the range expansion area or in the overlapping region, an average queuing delay of downlink data transmissions to the UEs in the range expansion area or in the overlapping region, cell identifiers of cells that overlap the small cell, and other information.

A range expansion area refers to an area where a signal strength of signals transmitted by a small cell eNB is weaker than signals transmitted by the macro eNB 104. A UE in the range expansion area can communicate with the small cell eNB despite the weaker strength signals in time intervals where the macro eNB 104 is configured to use an ABS subframe for downlink transmissions of the macro eNB.

The ABS assistance information 402 that is sent by the small cell eNB 108 or 114 to the macro eNB 104 can be included in a new X2 interface message, or a new information element of an existing X2 interface message. A new message or a new information element refers to a message or information element that is not provided by current standards (e.g. 3GPP standards), but which may (or may not) be defined by future standards. On the other hand, an existing message or an existing information element refers to a message or information element provided by current standards.

The macro eNB 104 can perform dynamic ABS assignment using the ABS assistance information 402 from the small cell eNB. Note that although FIG. 4 shows just one small cell eNB sending ABS assistance information 402 to the macro eNB 104, it is noted that multiple small cell eNBs can send their respective ABS assistance information to the macro eNB 104.

Alternatively, or additionally, a UE 110 or 116 (or multiple UEs) can send a measurement report 404 to the macro eNB 104. In some examples, the sending of the measurement report 404 can be on-demand in response to a measurement request 406 from the macro eNB 104. The measurement request 406 can be included in a dedicated Radio Resource Control (RRC) message or other message such as a Medium Access Control (MAC) control element (CE) sent by the macro eNB 104 to the UE. In other examples, the measurement report 404 can be sent by each UE autonomously, such as based on a schedule or other configuration.

The measurement report 404 can include information regarding one or more measured parameters of neighboring cells for the UE. The measured parameters can include a Reference Signal Received Power (RSRP), or a Reference Signal Received Quality (RSRQ), or both. The measurement report can also include some other measurement parameters, for example, post-processing SINR values, and so forth. The RSRP measures an average received power over resource elements that carry cell-specific reference signals within a certain frequency bandwidth. An RSRQ indicates a quality of a received reference signal. In other examples, the measurement report 404 can include other measured information regarding one or more cells.

The measurement report 404 can be carried in one or various different messages, such as a Medium Access Control (MAC) control element (CE). In some examples, the MAC CE can be a new MAC CE for carrying the measurement report 404. As an alternative example, the measurement report 404 can be carried in a dedicated RRC message, which can be a new message or an existing message that has a new information element.

Figure 5:
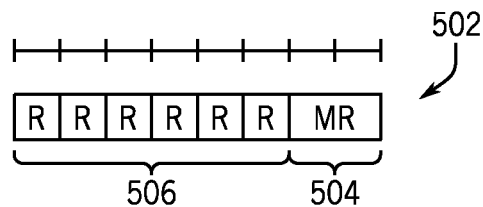
FIG. 5 is a schematic diagram of a measurement report according to some examples.

An example of a MAC CE 502 that can be used to carry the measurement request 406 is shown in FIG. 5. In some examples, the MAC CE 502 is an octet, which includes 8 bits. The two last bits 504 in the MAC CE 502 includes "MR" information, which can be set to one of various different values to indicate the type of information to be reported by the UE. For example, a table that maps MR values to the type of information reported is set forth below:

| MR | Measurement Reporting |
| --- | --- |
| 0 | RSRP reporting |
| 1 | RSRQ reporting |
| 2 | SINR reporting |
| 3 | RSRQ/RSRP |

An MR value of 0 indicates that RSRP is requested to be reported, an MR value of 1 indicates that RSRQ is requested to be reported, and an MR value of 3 indicates that both RSRQ and RSRP are requested to be reported. An MR value of 2 indicates that a measured Signal to Interference plus Noise Ratio (SINR) is requested to be reported. When the MR value indicates SINR reporting, a UE can post-process a received signal and report received SINR values. In other examples, the UE can send another type of measured parameter.

In some further implementations, the macro eNB 104 can configure one or more criteria for measurement reporting by the UE. For example, when the difference of RSRP or RSRQ or SINR values from two or more cells is below a specified threshold, then measurement reporting can be triggered. However, when the difference of RSRP or RSRQ or SINR values is not below the specified threshold, then measurement reporting is not triggered, and the UE does not send the measurement report 404. In this way, measurement reports sent by the UE in the uplink can be made to be less frequent, to reduce the amount of bandwidth in the uplink consumed by measurement reporting.

In further example implementations, a small cell eNB can send a UE's average channel quality indication (CQI) to the macro eNB 104 together with the ABS assistance information 402. The CQI provides an indication of the communication channel quality as observed by the UE. Based on the average CQI information from UEs, the macro eNB 104 can determine which UEs should send measurement reports, and thus the macro eNB 104 can send measurement requests to those UEs.

In other alternative implementations, a small cell eNB may configure an event trigger to locate UEs within or around a range expansion area. The event trigger can be based on one or more measured parameters, such as RSRQ, RSRP, or SINR. For example, as noted above, the measurement reporting is triggered in response to the difference of RSRP or RSRQ or SINR values being below a specified threshold. Based on the measurement reports (of RSRQ, RSRP, or SINR, or some combination of such parameters) from UEs, the small cell eNB can calculate the difference between an expected quality-of-service (QoS) for each UE and the target (promised) QoS for the UE, based on the current ABS configuration. The average QoS difference is reported to the macro eNB 104. Based on the number of UEs experiencing a deficit in QoS (with respect to the target QoS for each of the UEs), the macro eNB 104 can compensate for such deficit by dynamically adapting the ABS subframe assignment.

For example, it is assumed that there are N (N>1) UEs that reported measurements (of RSRQ, RSRP, or SINR, or a combination of the parameters) to their serving small cell eNB(s), based on an event trigger. Each UE-i (i=1 to N) has a specified target throughput of $\eta_i$ bits/second/Hertz. However, based on the measurement reporting, it is determined that UE-i is expected to get a throughput of $\zeta_i$ bits/second/Hertz. The value of $\zeta_i$ can be estimated based on the scheduling strategy employed at the small cell eNB to accommodate all the N UEs within M subframes (over some time interval, such as a 40-millisecond time interval) that are concurrently transmitted with ABS subframes from the macro eNB 104.

The average target QoS is computed as $$H = \frac{1}{M} \sum_{i=0}^{N-1} \eta_i,$$

while the expected QoS is computed as $$Z = \frac{1}{M} \sum_{i=0}^{N-1} \zeta_i.$$

The average QoS parameters H and Z are sent to the macro eNB 104. Based on the difference between the average QoS parameters, the macro eNB 104 can adapt the ABS configuration. Alternatively or additionally, the macro eNB 104 can allocate more resource blocks (RBs) to UEs for interference coordination. For example, the ABS configuration can be adjusted by minimizing $$H * \frac{L}{M} - Z,$$

where L represents the number of ABS subframes within the ABS window of M subframes.

When the macro eNB 104 cannot assign ABS subframes (i.e. L is too large so that the remaining L-M subframes are not enough to serve the macro eNB-connected UEs with acceptable QoS), the macro eNB 104 may request a small cell eNB to handover some of the UEs within a range expansion region to the macro eNB 104. Normally the UEs that are handed over to the macro eNB 104 are expected to obtain better QoS if served by the macro eNB 104, even when the same radio resources are reused by the small cell eNB(s) for UEs closer to the center of the small cell.

In further alternative implementations, measurement reports triggered by an on-demand measurement procedure may be first sent by a UE to the small cell eNB. The small cell eNB can then route the measurement reports to the macro eNB, such as over the X2 interface. In other implementations, the small cell eNBs can also combine measurement reports from multiple UEs into ABS assistance information that can be sent to the macro eNB 104.

After the macro eNB 104 determines the ABS configurations (e.g. subframe patterns 304 and 306 in FIG. 3) to use, the macro eNB 104 can send the ABS allocation to each small cell eNB. The macro cell may also send the ABS allocations of neighboring small cells to each small cell eNB, so that the UEs in an overlapping region can be scheduled in the appropriate subframes, and can be configured to perform resource-restricted measurements appropriately.

The procedure of a macro eNB 104 receiving ABS assistance information, receiving UE measurement reports, determining ABS configurations, and sending ABS allocations to small cell eNBs, may be repeated periodically or until one or more preconfigured events occur. In one example, a preconfigured event may include any of the following: an average queuing delay in at least one small cell exceeding a threshold value, a small cell being switched between an on and off state, and so forth.

When the macro eNB 104 sends a measurement request (404 in FIG. 4) to a UE, the macro eNB 104 can also include a list of small cell eNBs in the measurement request. The list of small cell eNBs identify those small cell eNBs to be measured by the UE. As a result, the UE only has to report the measurement results of the identified small cell eNBs, particularly SINR measurement results, for example. The UE can perform the specified measurements for the identified small cell eNBs, and only send measurement reports for small cell eNBs satisfying one or more criteria (e.g. RSRQ, RSRP, or SINR values of multiple small cells being less than a specified threshold). If the UE determines that none of the small cell eNBs satisfy the one or more criteria, the UE may still have to send a measurement report, but this measurement report may be an empty list.

Resource Partitioning

When the number of small cells is large, or the macro eNB 104 may not have the capability to fully control small cell eNBs, an alternative technique that does not rely on tight control may be beneficial for ABS allocation to mitigate interference.

In this alternative, the subframes in a radio frame can be split into multiple sets of subframes. The sets of subframes can be orthogonal sets or semi-orthogonal sets. Orthogonal sets of subframes do not share any subframes, while semi-orthogonal sets of subframes can share at least one subframe (in other words, the semi-orthogonal sets overlap).

In one example, there are 10 subframes per radio frame. If each set has two subframes, five orthogonal sets can be provided. In some examples, the size of each set can be different. For example, one set could have one subframe, while another set can have three subframes. In other examples, multiple radio frames can be grouped together to allocate the orthogonal sets of subframes. For example, for a four-radio frame group, there are a total of 40 subframes. If each set has two subframes, 20 sets are available for allocation. In some cases, two sets of subframes can overlapped, such that these overlapping sets are semi-orthogonal sets. Semi-orthogonal sets can be used when subframe resources are constrained, and the number of small cells is large. The subframe resource split can be predefined by a specification (such as by standards governing network communications), or can be preconfigured by the network and signaled using broadcast signaling or dedicated RRC signaling.

Figure 6:
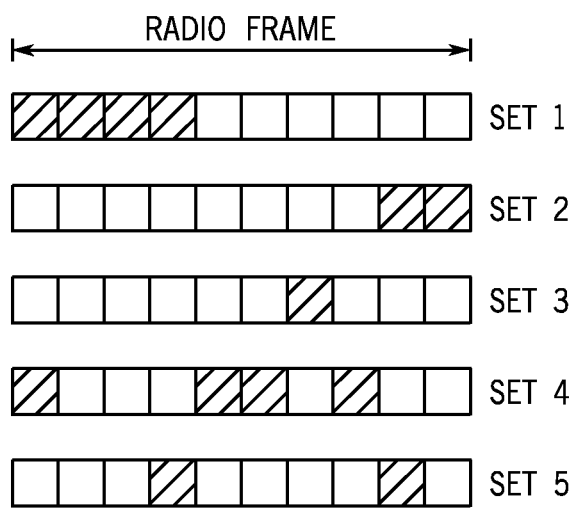
FIG. 6 is a schematic diagram of sets of subframes, according to some implementations.

Some examples of subframe splits are shown in FIG. 6, which depicts five sets (set 1, set 2, set 3, set 4, and set 5). In FIG. 6, a radio frame includes 10 subframes. In each set, the gray box(es) represents the subframe(s) included in that set. For example, set 1 includes subframes 1-4, set 2 includes subframes 9-10, set 3 includes subframe 7, and so forth. Set 2 is orthogonal to set 1. Set 3 is orthogonal to sets 1 and 2. Set 4 is orthogonal to sets 2 and 3, but overlaps set 1. Set 5 is orthogonal to sets 3 and 4, but overlaps each of sets 1 and 2.

Orthogonal sets can be used for small cells that heavily overlap (e.g. overlap by greater than a specified amount, such as a percentage of area). For example, set 1 can be used for a first small cell, while set 2 can be used for a second small cell, if the first and second small cells heavily overlap. For small cells that are neighboring cells but which do not heavily overlap, semi-orthogonal sets can be used for such small cells.

Also, the assignment of sets of subframes to small cells can be based on loading of the small cells. A small cell having a lighter loading can be assigned a set with a smaller number of subframes, while a small cell with a heavier loading can be assigned a set with a larger number of subframes. For example, during weekdays, some small cells may have less loading; therefore, the sets with less subframes can be given to these small cells. If during the weekend, these small cells have heavier loading, the sets with more subframes can be re-allocated to these small cells.

In some implementations, the total number of subframes can be split into a dynamic portion and a reserved portion. The dynamic portion can be dynamically requested and used by a small cell based on the small cell's traffic situation, while the reserved portion includes reserved resources that are reserved for each respective individual small cell. Note that dynamic and reserved resources can include subframes, as well as other resources, such as carriers of different frequencies.

The resource allocation controller 120 (FIG. 1), which can be part of the macro eNB 104, an anchor small cell eNB, or another network node, can first determine the resources (e.g. subframes and possibly other resources) to be included in the dynamic portion and the reserved portion. After the reserved resource for each small cell is determined, the resource allocation controller 120 can signal the allocation of the reserved resources to each small cell eNB, such as by use of X2 interface messaging. Note that the reserved resource(s) for each small cell can be adjusted in a semi-static way. The dynamic portion can be signaled to the small cell eNBs as well, in response to requests from small cell eNBs for all or some of the dynamic resources from the resource allocation controller 120, such as during periods of heavy traffic loading of the small cell eNBs.

In another alternative, each small cell eNB can be assigned an initial subframe to use. The small cell eNBs (and possibly macro eNBs as well) can place their served UEs on the initial subframe. When an eNB determines it has to have more subframes, the eNB can attempt to use the next, successive subframe (after the initial subframe). In some examples, cell-edge UEs (which communicate using the higher power) are preferred to be assigned on the initial subframe (to achieve less interference), while UEs closer to the cell center (which communicate using lower power) are preferred to be assigned on last-used subframes (that are last assigned to an eNB). In this way, when a given eNB becomes so heavily loaded that the eNB starts using a subframe allocated to a neighboring cell, the cell-center UEs served by the given UE are on the subframe allocated to the neighboring cell so that the interference with UEs in the neighboring cell is mitigated. The given eNB may have to signal to the neighboring cell, such as using X2 interface messaging, when the given eNB attempts to use the neighboring cell's subframe(s). The neighboring cell may adjust its resource allocation accordingly (e.g. the neighboring cell may stop using the subframe(s) being used by the given eNB) if the loading of the neighboring cell is not high.

The reserved portion of resources for use in small cell transmissions can be in the time domain (where the resources include subframes), in the frequency domain (such as with a carrier aggregation or CA-based solution), or a mixture of both. A carrier aggregation, which can be provided by an eNB, includes component carriers that are aggregated together. The UE can establish multiple concurrent wireless connections with the eNB on the respective component carriers.

The resources of the reserved portion can be used to configure resource-restricted measurements for UEs in overlapping regions. Resource-restricted measurements refer to measurements made by the UE on selected control signals.

In a time domain solution, the reserved portion can include M subframes out of N total subframes, e.g., 28 subframes from a total of 40 subframes. The resource allocation controller 120 can assign reserved subframes from the reserved portion to each of the small cell eNBs based on traffic conditions of the respective small cell eNBs. This assignment can be semi-statically adjusted (e.g. adjusted after some relatively long time interval) to avoid changing the reserved resource assignment too frequently.

In a frequency domain solution, the macro eNB 104 can simply assign one or multiple carriers to small cell eNBs in a manner that avoids interference.

Figure 7:
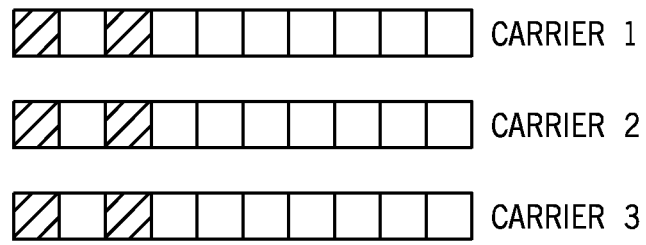
FIG. 7 is a schematic diagram of subframes assigned to a small cell on different carriers, according to further implementations.

In a mixed solution, over each carrier, a certain number of subframes are reserved to be used for the small cell eNBs. Over different carriers, the reserved numbers of subframes can be different, and the small cell eNBs can be assigned different amounts of time domain resources. In one example, all the carriers have the same assigned pattern, for simplicity. For example, as shown in FIG. 7, if a small cell eNB is assigned a particular set of subframes (gray boxes) on carrier 1, the same particular set of subframes can be assigned to the small cell eNB on other carriers (e.g. carriers 2 and 3) as well. This can reduce signaling overhead and also reduce implementation complexity.

In different examples, the assigned subframes on different carriers to a given small cell eNB can be different.

The dynamic portion of resources are used for faster assignment to small cell eNBs. The resources of the dynamic portion can be time domain resources, frequency domain resources, or a mixture of time-frequency domain resources.

For a time domain solution, a certain number of subframes are provided for dynamic assignment. The subframes of the dynamic portion can be requested and assigned based on conditions of a small cell eNB. The total number of dynamic subframes can depend on the loading distribution of small cells. The resource allocation controller 120 can adjust the dynamic portion and signal information relating to the dynamic portion to small cell eNB, such as by using X2 interface messaging.

In alternative examples, assuming that the resource allocation controller 120 is implemented in the macro eNB 104, in addition to being able to request that the macro eNB 104 assign more dynamic subframes, a small cell eNB can also request that the macro eNB 104 release subframes based on the macro eNB's traffic condition. In other alternative examples, the macro eNB 104 may request that small cell eNBs provide information relating to the loading conditions of the small cell eNBs from time to time, such that the macro eNB 104 can adjust the dynamic resources.

Figure 8:
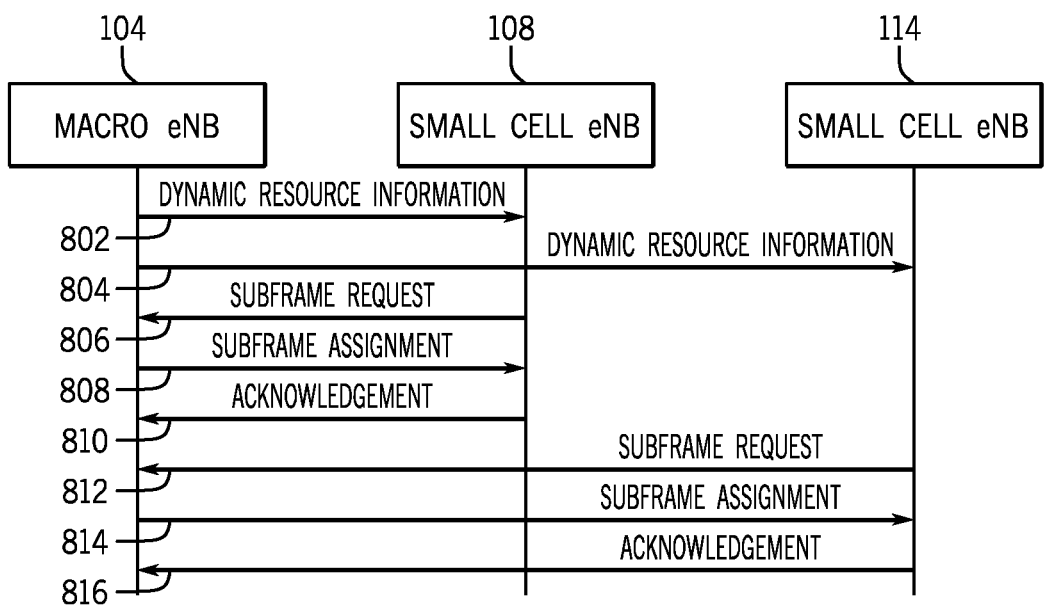
FIG. 8 is a flow diagram of a process of requesting and assigning dynamic resources, according to alternative implementations.

FIG. 8 is a flow diagram of a process of dynamic allocation of resources from the dynamic portion. In FIG. 8, it is assumed that the resource allocation controller 120 is part of the macro eNB 104.

The macro eNB 104 sends (at 802, 804) dynamic resource information (pertaining to the dynamic portion) to small cell eNBs (e.g. 108 and 114 in FIG. 8). There can be additional small cell eNBs in other examples. Also, although the dynamic resource information is depicted as being sent in two separate messages in FIG. 8, it is noted that in alternative examples, the macro eNB 104 can send one broadcast message to multiple small cell eNBs that carries the dynamic resource information.

At a later point, the small cell eNB 108 sends (at 806) a subframe request for a dynamic resource to the macro eNB 104. In response, the macro eNB 104 sends (at 808) a subframe assignment to the small cell eNB 108, to assign at least one subframe from the dynamic portion. The small cell eNB 108 can send (at 810) an acknowledgment of the subframe assignment back to the macro eNB 104.

Similarly, the small cell eNB 114 can send (at 812) a subframe request for a dynamic resource to the macro eNB 104. In response, the macro eNB 104 sends (at 814) a subframe assignment to the small cell eNB 114, to assign at least one subframe from the dynamic portion. The small cell eNB 114 can send (at 816) an acknowledgment of the subframe assignment back to the macro eNB 104.

Although the foregoing describes an example in which the resources assigned from the dynamic portion include subframes, it is noted that in alternative examples, the resources assigned by the macro eNB 104 can include resources in the frequency domain, or resources in a combination of the time and frequency domains.

An assigned dynamic resource may be valid only for specified time duration. This time duration can be preset or preconfigured by the network. Alternatively, the time duration can also be indicated together with the subframe assignment. A small cell eNB may also include in its subframe request a proposed time duration based on the buffer status of the small cell eNB. When the time duration expires, the dynamic resource is automatically released and the small cell eNB can no longer use the dynamic resource. The macro eNB 104 can then re-assign the released dynamic resource to another small cell eNB.

By using the dynamic resource assignment, dynamic resources can be more flexibly re-used among the small cells. The resources of the reserved portion are provided to ensure that all small cells have some certain guaranteed downlink throughput. The resources of the dynamic portion can be adjusted dynamically according to loadings of the small cells.

As noted above, the resources of the dynamic portion can include resources in the frequency domain, in which case the resources are carriers, or in the time-frequency domain, in which case the resources are carriers plus subframes. In the frequency domain solution, a few carriers can be dynamically assigned to small cell eNBs in response to small cell requests, or based on loading reports received by the macro eNB 104. In the time-frequency solution, over each carrier, the dynamic subframes can be independently allocated. The dynamic subframes allocated to a small cell eNB over multiple carriers can be according to the same subframe pattern, or a different subframe pattern, similar to the allocation of resources of the reserved portion discussed further above.

In some examples, the dynamic portion can include all available resources—in other words, there are no reserved resources. In this case, all resources are allocated on a dynamic basis. This can enhance resource reuse efficiency, but can also increase signaling load. This solution may be used in situations where the traffic is dynamic, and backhaul loading (over backhaul links between eNBs) is relatively light.

In further examples, the dynamic portion can be empty. In this case, all the resources are part of the reserved portion that are semi-statically assigned to the small cells.

In other examples, a resource controller may determine the portion of the dynamic portion and the reserved portion. This can be based on the load situation, traffic dynamics, radio conditions, and so forth. For example, during the night time, the resource controller may set all the resources to the reserved portion, while during busier times of the day, the controller may place a large amount of resources in the dynamic portion.

Resource Borrowing

Figure 9:
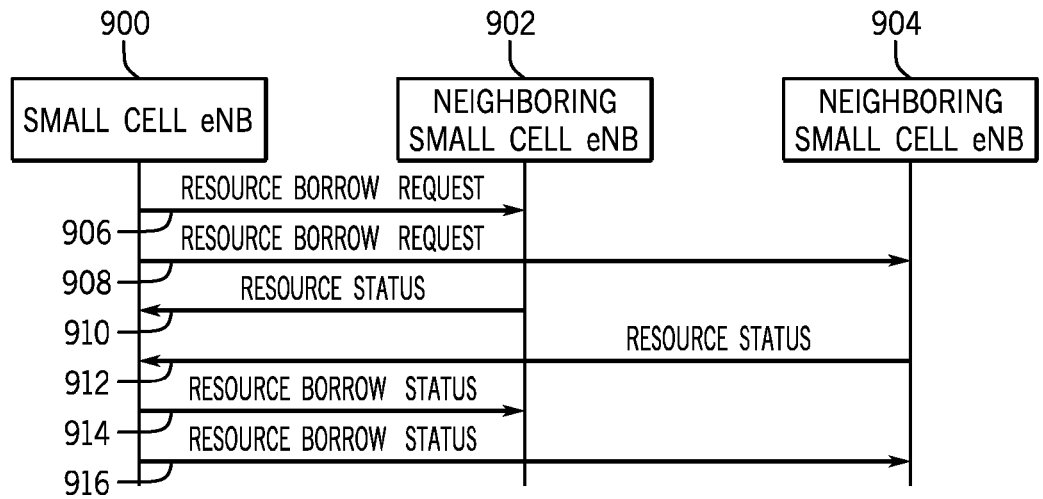
FIG. 9 is a flow diagram of a process of borrowing resources by a small cell, according to further implementations.

In further implementations, small cell eNBs can also use resource borrowing to temporally borrow resources from neighboring small cells. When a small cell eNB detects that it has a high traffic load, and no dynamic resource is available for dynamic assignment, the small cell eNB can trigger a resource borrowing process, such as depicted in FIG. 9. In FIG. 9, the small cell eNB that triggers the resource borrowing process is a small cell eNB 900, which can borrow resources from neighboring small cell eNB 902 or 904.

The small cell eNB 900 can send (at 906, 908) resource borrow requests to the respective neighboring cell eNBs 902 and 904. The neighboring cell eNBs 902 and 904 can respond (at 910, 912) with resource status messages back to the requesting small cell eNB 900. A resource status message includes the resources (e.g. subframes and/or carriers) that can be temporarily borrowed by the requesting small cell eNB 900. The resource status message can also include time duration information, for indicating a time duration over which the borrowed resource is valid and can be used by the requesting small cell eNB 900.

After receiving the resource status messages from its neighboring cell eNBs 902 and 904, the requesting small cell eNB 900 can determine what resources can be used for a time duration. After the determination, the requesting small cell eNB 900 can send (at 914, 916) resource borrow status messages to the respective neighboring small cell eNBs 902, 904 to indicate the resources that will be temporally reserved by the requesting small cell eNB 900. After receiving the respective resource borrow status message from the requesting small cell eNB 900, the neighboring small cell eNBs 902 and 904 will make a determination to not use the borrowed resources. If time duration for validity of the borrowed resources was indicated, the neighboring cell eNBs can also make a determination to not use the borrowed resources for the indicated time duration. After the time duration, the neighboring cell eNBs can use the borrowed resource, which is considered to have been automatically released by the requesting small cell eNB 900. If the time duration is not indicated, then the neighboring cell eNBs can use the borrowed resources when the resource is explicitly released by the requesting small cell eNB 900.

It is noted that the requesting small cell eNB 900 can decide to use the borrowed resource of just one of the neighboring small cell eNBs 902 and 904.

The resource borrowing can be performed in a distributed manner—in other words, small cell eNBs can borrow resources from their respective neighboring small cell eNBs without coordination of the resource allocation controller 120 (which can be part of the macro eNB 104 or in another network node). This is suitable for cases where small cells are out of the macro cell coverage and operates in an ad-hoc manner.

If the small cells are in the macro cell coverage and under the macro cell control, the resource borrowing can also be coordinated by the macro eNB 104. Note that in certain scenarios, the macro eNB 104 may not have the capability to assign resources to small cell eNBs, although in the dual connection case, macro eNB 104 may have such control. In scenarios where the macro eNB 104 does not have the capability to assign resources to small cell eNBs, the macro eNB 104 can operate like a loose coordinator, e.g. such as coordinating the resource borrowing process. Resource borrowing coordination can also be performed by an anchor small cell eNB.

System Architecture

Figure 10:
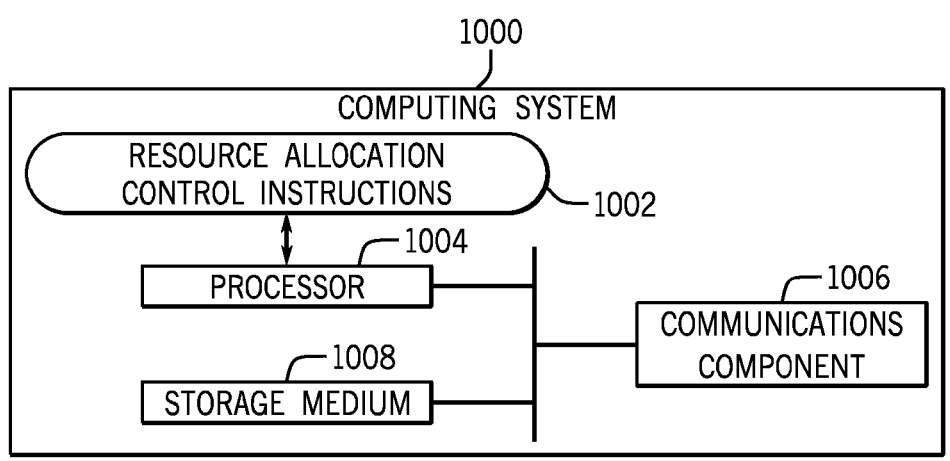
FIG. 10 is a block diagram of an example computing system according to some implementations.

FIG. 10 depicts a computing system 1000, which can be any of the macro eNB 104, small cell eNB, or resource allocation controller 120 discussed above. The computing system 1000 includes resource allocation control machine-readable instructions 1002, which are executable on a processor (or multiple processors) 1004 to perform various tasks discussed above. A processor can include a microprocessor, microcontroller, processor module or subsystem, programmable integrated circuit, programmable gate array, or another control or computing device.

The processor(s) 1004 can be coupled to a communication component 1006 to perform communications. For example, the communication interface 1006 can perform wireless communication over an air interface, or perform wired communication over a wired connection. In some cases, the computing system 1000 can include multiple communication components 1006 to communicate with respective different network nodes.

The processor(s) 1004 can also be coupled to a computer-readable or machine-readable storage medium (or storage media) 1008, for storing data and instructions. The storage medium or storage media 1008 can be implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method of interference mitigation, comprising:
receiving, by a controller in a network including small cells, information from the small cells, the information including a number of user equipments (UEs) in each of the small cells, and a data rate in each of the small cells; and
responsive to the received information including the number of UEs and the data rate in each of the small cells, coordinating, by the controller, allocation of resources for use by the small cells in communicating data with respective UEs, wherein the coordinating of the allocation of resources comprises dynamically adjusting assignments of almost blank subframes (ABS) to the small cells to reduce interference among the small cells.

2. The method of claim 1, further comprising:
sending, by the controller, an ABS assignment of a first of the small cells to a second of the small cells.

3. The method of claim 1, further comprising:
receiving measurement information from at least one of the UEs, wherein the coordinating is further based on the received measurement information.

4. The method of claim 3, further comprising:
sending, by the controller to the at least one UE, a request for the measurement information.

5. The method of claim 4, wherein sending the request for the measurement information comprises sending a list of small cells for which the at least one UE is to report the measurement information.

6. The method of claim 4, wherein sending the request for the measurement information comprises sending the request in a dedicated radio resource control (RRC) signaling to the at least one UE.

7. The method of claim 1, wherein the resources include reserved resources and dynamic resources, and wherein coordinating the allocation of resources comprises dynamically allocating the dynamic resources based on loading of the small cells.

8. The method of claim 7, wherein receiving the information comprises receiving a request from the at least one small cell for additional resources.

9. The method of claim 7, further comprising:
assigning, by the controller in a semi-static manner, the reserved resources to the small cells.

10. The method of claim 7, wherein the reserved resources and the dynamic resources include time domain resources, frequency domain resources, or a combination of time domain and frequency domain resources.

11. The method of claim 7, wherein allocation of a dynamic resource to a small cell is for a specified time duration.

12. The method of claim 1, wherein the resources include sets of resources, and wherein the coordinating comprises at least one of:
allocating orthogonal sets of resources to small cells that overlap by greater than a specified threshold; and
allocating semi-orthogonal sets of resources to small cells that overlap by less than the specified threshold.

13. The method of claim 12, wherein the coordinating further comprises:
allocating different sets of resources with different numbers of resources to different respective small cells based on traffic loading of the small cells.

14. The method of claim 1, wherein each of the small cells is assigned an initial resource to use, the method further comprising:
determining, by a small cell wireless access network node of a given one of the small cells, that a loading of the given small cell has increased; and
using, by the small cell wireless access network node, a next resource after the initial resource, in response to the determining.

15. A first wireless access network node for a first small cell, comprising:
at least one processor configured to:
send assistance information to a controller;
receive, from the controller, an allocation of resources for use by the first wireless access network node for communications of data with user equipments (UEs) served by the first wireless access network node, wherein the allocation is part of allocations of resources assigned by the controller to a plurality of small cells including the first small cell, wherein the allocations are for reducing interference among the small cells and are based on the assistance information; and
borrow a resource from at least one neighboring small cell wireless access network node, the borrowing comprising:
sending a resource borrow request from the first wireless access network node to the neighboring small cell wireless access network node;
receiving a message including information indicating at least one resource for borrowing by the first wireless access network node, the at least one resource being a resource that is part of the allocation of resources assigned by the controller to the neighboring small cell wireless access network node; and
causing use of the at least one resource by the first wireless access network node.

16. The first wireless access network node of claim 15, wherein the resources include almost blank subframes or dynamic resources.

17. A controller comprising:
at least one processor configured to:
receive information from a plurality of small cells; and
responsive to the received information, coordinate allocation of resources for use by the small cells in communicating data with respective user equipments (UEs), wherein the coordinating of the allocation of resources reduces interference among the small cells;
allocate orthogonal sets of resources to small cells that overlap by greater than a specified threshold; and
allocate semi-orthogonal sets of resources to small cells that overlap by less than the specified threshold.

18. The method of claim 1, wherein the received information further comprises a queuing delay in each of the small cells, and the coordinating is further based on the queuing delay.

19. The method of claim 18, wherein the data rate in a respective small cell of the small cells is an aggregate data rate of communications between UEs and the respective small cell, and wherein the queuing delay is an average queuing delay of data in at least one queue for the communications, and wherein the coordinating is based on the aggregate data rate and the average queuing delay.

20. The method of claim 1, further comprising:
in response to a difference between a target quality of service (QoS) and an expected QoS in a first small cell of the small cells, changing, by the controller, the assignments of the almost blank subframes (ABS) to the small cells.

21. The method of claim 20, further comprising:
in response to determining that a number of almost blank subframes (ABS) assigned in the assignments of the almost blank subframes (ABS) causes given UEs to not be able to meet the target QoS, requesting, by the controller, the first small cell to handover the given UEs to a macro cell.

22. The first wireless access network node of claim 15, wherein the assistance information comprises a number of user equipments (UEs) in the first small cell, and an aggregate data rate of communications between the UEs and the first wireless access network node.

23. The first wireless access network node of claim 22, wherein the assistance information further comprises an average queuing delay of data in at least one queue to be communicated to the UEs in the first small cell.

24. The first wireless access network node of claim 22, wherein the assistance information further comprises identifiers of small cells that overlap the first small cell.

25. The controller of claim 17, wherein the information comprises a number of user equipments (UEs) in a respective small cell of the plurality of small cells, and an aggregate data rate of communications between the UEs and the respective small cell, wherein the coordinating of the allocation of the resources for use by the small cells is based on the number of UEs and the aggregate data rate.

* * * * *